(12) United States Patent
Filtvedt et al.

(10) Patent No.: US 9,156,704 B2
(45) Date of Patent: Oct. 13, 2015

(54) REACTOR AND METHOD FOR PRODUCTION OF SILICON

(75) Inventors: Josef Filtvedt, Tomter (NO); Werner O. Filtvedt, Tomter (NO)

(73) Assignee: Dynatec Engineering AS, Askim (NO)

(*) Notice: Subject to any disclaimer, the term of this patent is extended or adjusted under 35 U.S.C. 154(b) by 905 days.

(21) Appl. No.: 13/266,850

(22) PCT Filed: May 27, 2010

(86) PCT No.: PCT/EP2010/057329
§ 371 (c)(1),
(2), (4) Date: Jan. 10, 2012

(87) PCT Pub. No.: WO2010/136529
PCT Pub. Date: Dec. 2, 2010

(65) Prior Publication Data
US 2012/0100060 A1   Apr. 26, 2012

(30) Foreign Application Priority Data

May 29, 2009   (NO) .................................... 20092111

(51) Int. Cl.
| | | |
|---|---|---|
| *C01B 33/027* | (2006.01) | |
| *C01B 33/029* | (2006.01) | |
| *C01B 33/03* | (2006.01) | |
| *C01B 33/031* | (2006.01) | |

(Continued)

(52) U.S. Cl.
CPC ............. *C01B 33/027* (2013.01); *C01B 33/029* (2013.01); *C01B 33/03* (2013.01); *C01B 33/031* (2013.01); *C01B 33/033* (2013.01); *C01B 33/035* (2013.01)

(58) Field of Classification Search
CPC .... C01B 33/027; C01B 33/029; C01B 33/03; C01B 33/033; C01B 33/043; C01B 33/107; C01B 33/10773; C23C 16/22; C23C 16/24; C30B 29/06; B01J 19/12; B01J 19/128
USPC .......... 423/342, 347–349; 422/139, 145, 211, 422/240, 241; 427/213, 237, 255.18, 427/255.27
See application file for complete search history.

(56) References Cited

U.S. PATENT DOCUMENTS

| | | | |
|---|---|---|---|
| 3,979,490 A |   | 9/1976 | Dietze et al. |
| 4,023,520 A | * | 5/1977 | Reuschel ...................... 118/665 |

(Continued)

FOREIGN PATENT DOCUMENTS

| | | |
|---|---|---|
| DE | 4127819 A1 | 2/1993 |
| EP | 1666414 A1 | 6/2006 |

(Continued)

OTHER PUBLICATIONS

Rigondaud, Bernard, "International Search Report" for PCT/EP2010/057329 as mailed Sep. 29, 2010, 4 pages.

*Primary Examiner* — Colleen Dunn
(74) *Attorney, Agent, or Firm* — Winstead PC

(57) ABSTRACT

Reactor for producing silicon by chemical vapor deposition, the reactor comprising a reactor body that forms a container, at least one inlet for a silicon-bearing gas, at least one outlet, and at least one heating device as a part of or operatively arranged to the reactor, distinctive in that at least one main part of the reactor, which part is exposed for silicon-bearing gas and which part is heated for deposition of silicon on said part, is produced from silicon. Method for operation of the reactor.

7 Claims, 1 Drawing Sheet

(51) Int. Cl.
  *C01B 33/033*  (2006.01)
  *C01B 33/035*  (2006.01)

(56) References Cited

U.S. PATENT DOCUMENTS

| | | | |
|---|---|---|---|
| 4,786,477 A | * | 11/1988 | Yoon et al. .................... 422/145 |
| 4,818,495 A | | 4/1989 | Iya |
| 5,810,934 A | | 9/1998 | Lord et al. |
| 6,365,225 B1 | | 4/2002 | Chandra et al. |
| 2009/0047204 A1 | * | 2/2009 | Kim et al. .................... 423/349 |

FOREIGN PATENT DOCUMENTS

| | | | | |
|---|---|---|---|---|
| GB | 2185008 A | | 7/1987 | |
| KR | WO 2008/018760 | * | 2/2008 | ............. C30B 29/06 |
| WO | WO-00/49199 A1 | | 8/2000 | |
| WO | WO-2008/018760 A1 | | 2/2008 | |

\* cited by examiner

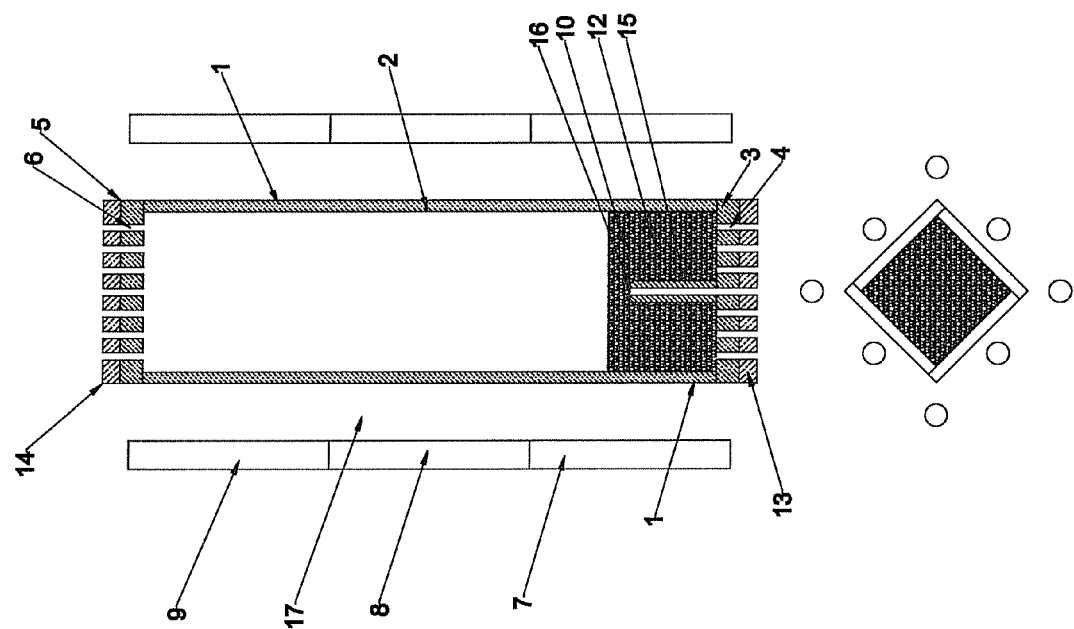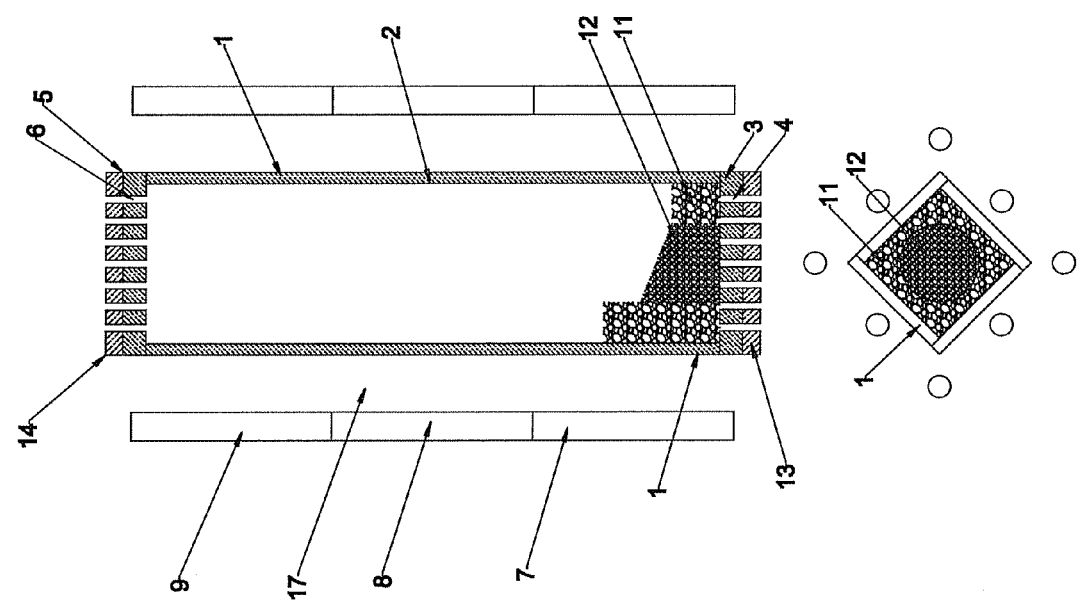

REACTOR AND METHOD FOR PRODUCTION OF SILICON

FIELD OF INVENTION

This invention concerns the production of silicon. More precisely, it concerns a reactor and a method for production of polycrystalline silicon using a method for vapor deposition.

BACKGROUND OF THE INVENTION

Silicon is a very important material in the electronics industry and the solar cell industry. Currently, high-purity silicon for use in the solar cell industry can be produced using metallurgical methods. However, silicon of metallurgical quality results in solar cells with limited efficiency. Methods for chemical vapor deposition (CVD) must be used to produce silicon of sufficient purity that gives higher efficiency for solar cells in addition to applications within the electronics industry. Silicon waste from the electronics industry has been used for producing solar cells. However, the growth of the solar cell industry has caused shortage of silicon. The world's huge need for environmentally friendly energy, in addition to the continually growing importance and spread of the electronics industry, involves a great need for equipment which contributes to the production of high-purity silicon at low costs.

The Siemens process is the most widespread method for CVD used to produce polycrystalline silicon. More precisely, a halosilane, like trichlorosilane, deposits onto a resistance heated rod. The energy requirement is high. A more detailed description of the process is described in the patent publication U.S. Pat. No. 3,979,490.

Another method for CVD is fluidized bed pyrolysis, wherein silicon seed particles are surrounded by and kept in an ascending gas flow, as the gas flow comprises silicon-bearing gas, from which silicon can deposit onto the seed particles. The advantage using this fluidized bed is the vast surface area onto which silicon can deposit, which enables the possibility of increased and continuous production as well as lower energy consumption. However, a practical and simple way to bring out particles that has grown sufficiently large is hard to achieve in practice. More precisely, it is hard to control the particle size in a fluidized bed reactor, and it is very hard to control the distribution of the particles in the operating reactor. The uneven distribution of the particles affects the flow state, which again affects the temperature distribution and the depositing of silicon. The method requires adding new particles from outside the reactor or small particles that form in the reactor during operation. The drainage of large particles in the bottom of the reactor as well as the addition of small particles that should increase in size requires at the same time controlling many parameters, which has proven to be very hard in practical operation over time. A common problem in CVD reactors is that particles grow together and gradually block the fluidization. Furthermore, the decomposition of silane or halosilane in a heated fluidized bed reactor can cause deposits of fine particles, which is undesirable, as accessories for particle separation and subsequent melting are required. This causes comprehensive handling and increased risk of contamination and loss of material.

The biggest problem in CVD reactors, however, is usually unwanted deposition of silicon onto the inner surfaces of the reactor and nozzles, which causes the nozzles and the reactor volume to clog. To prevent such undesirable deposits of silicon, the seed particles in a fluidizing reaction zone must be kept at a reaction temperature while the temperature of the reactor walls and nozzles must be kept significantly lower, which is extremely hard to achieve, especially when heating from outside the reactor. The problem is discussed in the patent publication U.S. Pat. No. 4,818,495, column 2, line 40, to column 3, line 20, and in the patent publication U.S. Pat. No. 5,810,934. A technique that is deployed to be able to loosen silicon from the reactor walls and its nozzles, is to apply a non-stick coating to the surfaces, which simplifies the subsequent manual or automated removal of silicon deposits.

A thorough description of methods for CVD with a fluidizing bed and appurtenant equipment as well as operation parameters for the production of silicon, including gas mixtures, temperatures for deposits and problems and limitations concerning this, can be found in the patent publications U.S. Pat. No. 4,818,495 and U.S. Pat. No. 5,810,934 which contain detailed information.

There is a need for an alternative technology which is advantageous with regard to one or more of the problems mentioned above.

SUMMARY OF THE INVENTION

The need is met by the invention providing a reactor for producing silicon by chemical vapor deposition, the reactor comprising a reactor body that forms a container, at least one inlet for a silicon-bearing gas, at least one outlet, and at least one heating device as a part of or operatively arranged to the reactor. The reactor is distinctive in that at least one main part of the reactor, which part is exposed for silicon-bearing gas and which part is heated for deposition of silicon on said part, is produced from, i.e. made of, silicon.

Accordingly, the reactor is adapted for batch production in a flow through process, as at least said main part is heated in order to purposively decompose the reaction gas and deposit silicon on at least said part, so at least said part can be sold or further processed as a silicon product after the reactor has grown tight by deposited silicon. The main part, or at least an inner part thereof exposed for silicon-bearing gas during operation, is made of silicon. Preferably the main part is the reactor body or a wall or pipe section thereof. The fundamental idea of the reactor is that all or a significant part of the materials that are exposed to the silicon-bearing gas are made of silicon, preferably of high purity, so that the depositing of the silicon deliberately can be led to occur on these materials. The known problems with separating silicon from other materials, in addition to many of the problems associated with clogging, will be avoided or reduced. At the same time, this will result in many additional possibilities of how the reactor can be built and operated, including how the heating can be achieved.

In its simplest form, the reactor is a closed container, mainly consisting of silicon, which is used for chemical vapor deposition of silicon on the inside, without silicon seed particles or a fluidized bed, and possibly also deposition of silicon on the outside if the reactor is placed in a chamber or an outer container containing silicon-bearing gas. A reactor of this type can for instance be resistance heated using electrical current. In more advanced implementations, the reactor is also adapted to use a fluidized bed and seed particles, as growth of silicon deliberately takes place both on the silicon materials of the reactor as well as on the seed particles. A rotation reactor or oven is also a preferred implementation, particularly suited for large scale production, as the rotation axis and the slope angle can be changed adequately. A mildly sloping seed particle-bearing rotation reactor can be particularly advantageous to get a proper material flow towards one end where the particles can be extracted. Rotation, fluidized bed, deposits on the inside of the reactor walls, deposits on the outside of the reactor walls as well as deposits on input elements such as silicon rods, are all features that can be combined to increase the industrial applicability. The reactor is advantageously built by silicon of metallurgical purity or higher purity, preferably all parts onto which silicon is being deposited and as a minimum one main part, such as a wall or a part of a tube of the reactor. Presently, silicon of metallurgical purity can be produced at advantageously low costs and with a purity that is sufficient for use in solar cells. When the main volume or a main part of the weight of silicon in a closed or manufactured reactor is of higher purity than metallurgical silicon, the whole reactor containing high-purity silicon can be melted down for recrystallization and use in the electronics industry and/or solar cells with higher efficiency, as the average purity will be sufficient. Possibly, the outer part of metallurgical silicon can be removed in a non-contaminating way, for instance by waterjet cutting, machining, or melting of the above-mentioned layer if only the very highest purity is acceptable. Possibly, the reactor can be manufactured from silicon of the same high purity as it produces, whose quality is suitable for the electronics industry. The strongly simplified handling of a closed or manufactured reactor causes less handling and contaminating of the silicon than what is achievable today. The reactor advantageously deploys numerous of the technical features of today's technology for producing silicon using chemical vapor deposition, however, it has been advantageously adjusted to be able to lead silicon deposits to the side wall at a wanted and adjustable level, during the whole or the final part of the operating period.

A part of a wall or a tube of the reactor body and at least one inner part of a top as well as at least one inner part of a bottom, all produced from silicon, preferably of metallurgical purity or higher, is advantageous. The reactor is advantageously adjusted for the production of silicon using vapor deposition of silicon both onto the inner silicon surface and onto seed particles, as the reactor comprises at least one inlet or a gate for seed particles as well as at least one heating device which can heat at least the wall of the reactor body to a reaction temperature. The reactor also advantageously comprises a gate for extracting silicon particles, so that a continuous production, like in a fluidized bed reactor, can be achieved at least in the initial part of the operating period for the reactor, after which the operation can be controlled to pack or fill the reactor in a controlled manner in the final part of the operating period.

The reactor advantageously comprises a central inlet tube of silicon, for feeding silicon-bearing gas and/or seeds. This inlet tube extends into a lower part of the container and is surrounded by a number of inlets for other gases, like inert fluidized gas, hydrogen and possibly also silicon-bearing gas and other gases, through a bottom part, possibly also through a top part, These inlets are preferably symmetrical and radially arranged around the inlet tube. The reactor advantageously comprises a vertical standing silicon tube with a silicon cap in an upper end and a silicon cap in a lower end. Another advantageous implementation is as an oblong standing reactor with a square or rectangular cross-section, which can simplify the reactor manufacturing and the subsequent cutting.

The devices for the heating of the reactor in accordance to the invention, advantageously comprise a coherent or non-coherent heating light source of each suitable wave length and effect, such as for instance a microwave source, a radio wave source, a source to visible light, a source to infrared light and/or a source to ultraviolet light, preferably a source to infrared light. The devices especially advantageously comprise one or more heating light sources that are directed into the reactor, especially heating light sources arranged in a bottom head and/or a top head of the reactor, arranged concentrically or equivalent inside feed pipes or equivalent for inert gas, so that the inner surfaces of the reactor and the particles inside the reactor are irradiated and thus heated, whereas the light source is protected from silicon deposits and is cooled by the inert gas. The inert gas, which in this context is a gas that does not contain silicon, flows around and protects against depositing of silicon and cools the heating light source. Thus, an increased production rate can be achieved.

The invention also comprises a method for operating a reactor in accordance to the invention, distinctive in that the devices for heating the reactor and the devices for fluid flows are controlled so that the depositing of silicon in the final part of the operating period of the reactor takes place radially inwards towards a central axis through the reactor. A particularly advantageous effect is achieved by controlling inner and outer heating light sources which in principal only heat the surfaces or the objects that are being radiated. Especially advantageous is the employment of heating light sources which irradiate the inner surfaces and particles in the reactor to an increasing extent in a final part of the operating time of the reactor.

FIGURE

This invention is illustrated by the means of a FIGURE, more exactly FIG. 1, which illustrates two implementations of the reactor according to the invention, without and with a fluidized bed, respectively.

DETAILED DESCRIPTION

Referring to the drawings, FIG. 1 illustrates two implementations of reactor according to the invention, without and with a fluidized bed, accordingly.

The implementation without a fluidized bed is illustrated in the left FIGURE, where the reactor is surrounded by heating light sources 7, 8, 9 and prior to start-up is filled with coarser silicon particles 11 against the walls and the corners than in the center 12. More exactly, the reactor consists of sidewalls 1 and bottom head 3 of pure silicon, which should or can be a part of the final product. The reactor can also be equipped with a top head 5 of pure silicon, which can be included when the reactor is being replaced after ended process. The sidewall can be polygonal or circular depending on which material that is available. The bottom head 3 and the top head 5 are equipped with holes 4, 6 for silicon-bearing gas 10, which will flow through the reactor and deposit pure silicon onto the inside of the heated walls in the reactor. The whole reactor is replaced by a new silicon reactor equipped with bottom head 3 and top head 5 when the tube has been filled with pure silicon all the way to the middle of the reactor, or so long it is economically sound to run the process. The increasing wall thickness results in a constantly decreasing volume for the silicon-bearing gas, and the production per hour will decrease over time and cease when the tube is clogged. A heating light source 7, 8, 9 is placed outside the reactor and transfers the heat to the outer surfaces of the reactor by radiation. The heating light source is divided into 2, 3 or more sections on top of each other to enable controlling the temperature in the height of the reactor. The heat is led from the heating light source 7, 8, 9 through the silicon wall 1 to the inside 2 of the wall which will be the hottest surface inside the reactor. The bottom head 3 rests on a surface of quartz/graphite 13 or another conductive material which has the same pattern of holes as the bottom piece. The surface 13 has a coating on the surface that prevents contamination from the surface 13 to the bottom head 3 in the silicon reactor.

When employing an outer heat source, the chamber around the reactor must be filled with a non-contaminating neutral gas 17 when starting the process. Silicon-bearing gas that is supplied inside the reactor at slightly higher pressure than in the heating chamber will leak through fractures in the corners of the silicon tube. These fractures will gradually be sealed by the silicon that deposits onto the surfaces. Early in the process, the heating can be directed towards the corners and the ends of the silicon tube to steer the depositing of silicon in the early phase towards surfaces which need sealing. The heating of the reactor can also be accomplished by electrical current directly through the walls of the silicon tube, or by a combination of both outer and possibly inner heat sources as well as resistance heat directly in the walls of the silicon tube, or by using other methods. If all the heating is accomplished with resistance heat directly in the silicon wall and the outer heat source is removed, depositing of silicon can occur both outside and inside onto the reactor when supplying silicon-bearing gas both on the outside and on the inside. The reactor is intended for use only once and is replaced as a unit when the reactor as finished the process and is ready for replacement. The reactor can be run empty without seeding particles, or filled with a preferred amount of seeding material. A typical particle size of the seeding material 12 is a diameter of 0.2-20 mm when the process starts. Coarse, pure silicon by the walls in the reactor has a larger diameter, or edges if powdered silicon material is being used.

The gas flow can be directed towards the inside walls by the means of several nozzles in the bottom head 3 and the top head 5, and the tube can be filled with coarse-grained and/or fine-grained pure silicon which gives different resistance against the gas flow in the tube. Coarse-grained, pure silicon is illustrated furthest out by the corners of the reactor, and fine-grained, pure silicon towards the middle of the reactor. This will result in an increased flow of silicon-bearing gas furthest out by the corners of the reactor, thus more quickly depositing pure silicon on the inside of the corners of the reactor. The gas flow is directed towards the inside (and possibly the outside) of the silicon tube reactor by directing the gas to the nozzles closest to the wall early on in the process. New nozzles directed towards the center of the reactor are gradually employed as the reactor is filled with pure silicon inwards towards the center of the reactor. Completely filled reactor units, possibly filled with seed particles, are handled as a complete block, and are placed in a heat chamber by a robot or another automatic device. The reactor is inside the heat chamber until the process is completely finished, and the temperature is reduced to a desirable level before opening the heat chamber. The complete reactor, which after the finished process is a complete block of pure silicon, can be retrieved by the same robot that placed it in the chamber, and the block is transported to post-processing. The dimension of the block can be adjusted to the next stage of processing or to the end customer, so that the cutting can be reduced to only one cut crosswise, and any contaminating crushing of the silicon block can be avoided. The block can thus be cut using a non-contaminating method.

Referring to the drawing, the right side of FIG. 1 illustrates a reactor according to the invention with a fluidizing bed. In addition to the reactor without a fluidizing bed, the reactor contains an inlet tube 15 of silicon which should be used only once and replaced as a complete unit together with the rest of the reactor when the process is finished. The reactor is filled with a desirable amount of seeding material in particle form which is suitable for use in a fluidizing layer reactor. A typical particle size is a diameter of 0.2-4 mm when the process starts. The fluidizing gas 10 is fed through the bottom head 3 via the inlet nozzles 4. The silicon-bearing gas is fed through the inlet tube 15 which extends somewhat upwards in the center of the reactor. The silicon-bearing gas enters the reactor at a too low temperature for any depositing to take place. When the gas hits the hot surfaces, it is being heated until it reaches a temperature at which depositing can occur. Depositing of silicon from a silicon-bearing gas will at first happen onto the surfaces with the highest temperature, and external heating will thus cause a controlled growth on the inner walls and inwards towards the middle of the reactor. The same thing will occur if the heating is accomplished by electrical current directly through the silicon walls of the reactor. The gas flow in the silicon tube can be directed towards the walls inside the silicon tube by the means of several nozzles in the bottom head 3 and the top head 5 which control the gas flow for each of the nozzles depending on the progress of the process. Equipment for individual directing of the gas flow to the nozzles is not illustrated. Towards the end of the process, when the particles are beginning to fasten and the fluidizing no longer works, the fluidizing gas can be shut off, and silicon-bearing gas is fed through all the nozzles to deposit as much silicon as possible before the process is finished and the reactor is replaced as a whole block. Further processing can take place as mentioned above.

Only two specific implementations are illustrated. However, the reactor can obviously have any implementation and shape that is suitable. In addition to those mentioned above, the shape can for instance be ellipsoidal, which, like for example tubular shapes, can be achieved with rotational molding, shell molding or other molding methods using silicon melt. The reactor can be assembled from plates and other suitable parts using fusion welding or resistance seam welding, such as resistance-but welding, with or without shielding gas. Electron beam welding, laser welding and friction welding are other possible production methods. Additionally, the reactor can be adapted for rotation, around any axis of rotation, symmetrical or non-symmetrical, vertical, aslant or horizontal.

Operative combinations of the reactor and the method as defined in the independent patent claims, in any combination with features or stages that are mentioned or illustrated in this document, is a part of the invention.

The invention claimed is:

1. A reactor for producing silicon by chemical vapor deposition, the reactor comprising:
    a reactor body that forms a container;
    at least one inlet for a silicon-bearing gas;
    at least one outlet;
    a wall made of silicon of at least metallurgical quality; and
    at least one heating device as a part of or operatively arranged to the reactor arranged to heat the wall for chemical vapor deposition of solid silicon on an inside of said wall.

2. A reactor according to claim 1, wherein the reactor comprises at least one inlet for seed particles and the at least one heating device which can heat at least the wall of the reactor body to a reaction temperature for production of silicon by chemical vapor deposition both on an inner silicon surface of the wall of the reactor and on seed particles.

3. A reactor according to claim 1, wherein the reactor comprises a central inlet tube of silicon which extends into a lower part of the container and is surrounded by a number of inlets for gas through a bottom head which are symmetrically and radially arranged around the central inlet tube.

4. A reactor according to claim 1, wherein the reactor comprises a silicon tube with a silicon cap in one end and a silicon cap in another end.

5. A reactor according to claim 1, wherein the at least one heating device comprises a heating light source.

6. A reactor according to claim 1, wherein the at least one heating device comprises one or more heating light sources in a bottom head and/or a top head of the reactor, in substance concentrically arranged inside feed pipes for inert gas, so that an interior of the reactor and contents of seed particles are irradiated and thus heated.

7. A method for operating a reactor according to claim 1, wherein the at least one heating device and fluid flow devices for fluid flows are controlled in a such way that depositing of silicon in a final part of an operating time of the reactor takes place radially inwards towards a central axis through the reactor.

* * * * *